Jan. 11, 1927. 1,613,905
G. O. ROCKWOOD
PULLEY CONSTRUCTION
Filed July 14, 1924
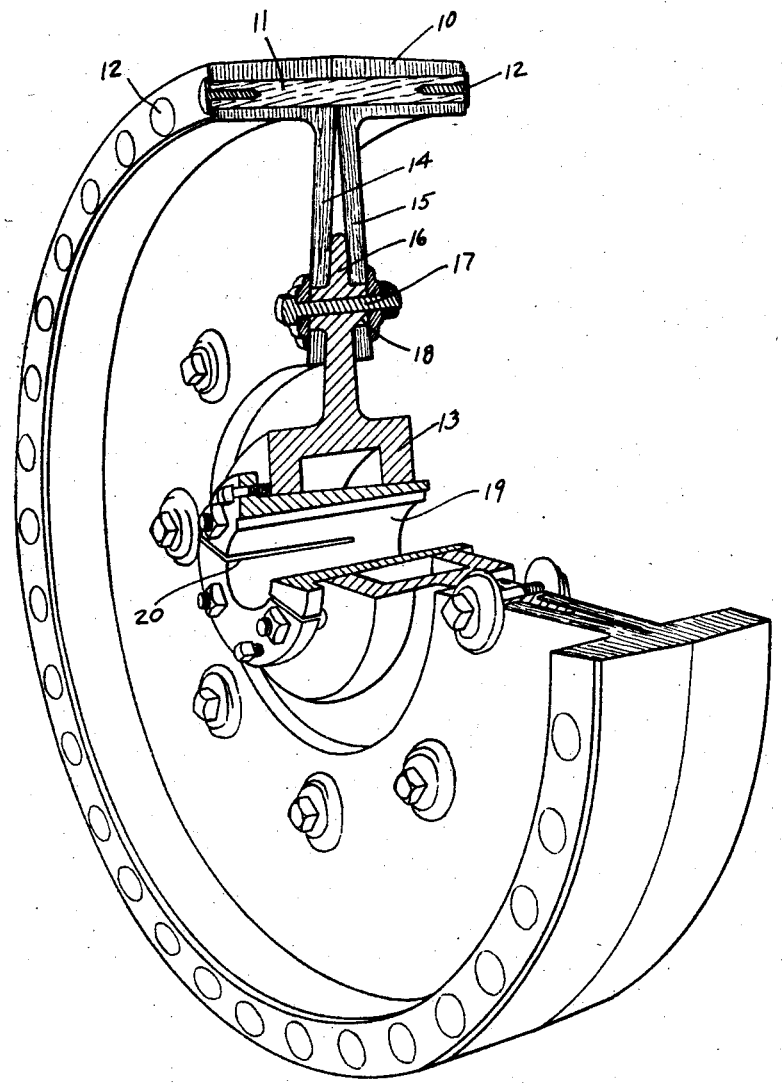
INVENTOR.
GEORGE O. ROCKWOOD.
BY
ATTORNEYS.

Patented Jan. 11, 1927.

1,613,905

UNITED STATES PATENT OFFICE.

GEORGE O. ROCKWOOD, OF INDIANAPOLIS, INDIANA, ASSIGNOR TO THE ROCKWOOD MANUFACTURING COMPANY.

PULLEY CONSTRUCTION.

Application filed July 14, 1924. Serial No. 726,030.

This invention relates to a fibre power and transmission pulley, and particularly to the construction of the hub and web portions of the pulley.

Heretofore pulleys of this character have been made with a web formed of a single or laminated layers of compressed fibre extending at right angles to a plane through the axis of the pulley and of substantially the same thickness throughout. This type of pulley is generally used in large sizes, having relatively large diameters for heavy duty.

The object of this invention is to prevent any warping, distortion or weakening of the web between the hub and rim, by providing the dished web formed of two discs of laminated fibre having their outer peripheries pressed together and combined with the fibre rings for forming the portions of friction surface and their inner peripheries spaced apart and separated by the flange of the hub and the driving lugs.

The full nature of the invention will be understood from the accompanying drawings and the following description and claims.

In the drawings the figure is a perspective view of the pulley with a quadrant section cut therethrough.

In the drawings there is shown a fibre pulley having a rim or friction belt surface 10 formed in the usual manner by compresing a plurality of fibre rings or laminations together and securing them with respect to each other by passing a dowel pin 11 therethrough and wedging the same in place by means of the metal caps 12.

The fibre rim is supported by a web intermediate said rim and the hub 13. This invention contemplates forming the web from two discs 14 and 15 of compressed fibre, said discs being spaced apart a substantial distance at their inner periphery by the hub flange 16 and securely bolted thereon by the bolts 17. The outer peripheries of said discs are brought together and compressed with the fibre rings constituting the friction rim in service with the pulley, said discs forming a part of the rim and the outer peripherial edge thereof forming a part of the friction surface. By reason of the separated and spaced discs extending at an angle to each other, the web portion of the pulley is greatly strengthened and warping or distortion thereof is prevented.

At the same time the web is, to all intents and purposes, formed as an integral part of the rim and friction surface.

In addition to the bolts 17 for securing the discs on each side of the flange 16, said flange is provided with corresponding outwardly projecting lugs 18 adapted to extend through holes formed in the discs, and through which the bolts 17 extend, said lugs acting to further assure a rigid connection between the hub and disc, but principally to provide an increased driving connection and surface therefor.

The hub 13 is formed integral with the spacing flange 16 and driving lugs 18 and is adapted to receive an elongated tapered bushing 19 provided with a plurality of longitudinally extending slots 20 for insuring a positive and permanently tight fit on the shaft, and readily adjust itself to any variation or unevenness in the shaft diameter, whereby it may be more readily mounted or removed therefrom.

The invention claimed is:

1. In a power and transmission pulley, a hub, a web structure consisting of a pair of fibre discs having their inner peripheries spaced apart and connected with said hub, and a rim formed of a plurality of fibrous rings compressed and secured together so as to embrace the outer peripheries of said discs whereby they will form a part of said rim.

2. In a power and transmission pulley, a hub, a web structure mounted on said hub consisting of a pair of fibrous discs having their inner peripheries spaced apart and secured to said hub, and a rim formed of a plurality of fibrous rings compressed and secured together on each side of said web structure so as to be supported thereby, the outer peripheries of said fibrous discs being compressed against each other between the fibrous rings so as to form a part of said rim.

3. In a power and transmission pulley, a hub, an outwardly extending flange formed on said hub, a web on said hub supported by said hub consisting of a pair of fibrous discs having their inner peripheries separated and secured to said flange, and a rim formed of a plurality of fibrous rings compressed and secured together adjacent the outer peripheries of said fibrous discs whereby said discs will extend into said rim and be compressed with said fibrous rings for forming a part thereof.

4. In a power and transmission pulley, a hub, an outwardly extending flange formed on said hub, a pair of oppositely extending lugs formed on each side of said flange, a web mounted on said hub consisting of a pair of fibrous discs having their inner peripheries separated and spaced apart by said flange, a rim formed of a plurality of fibrous rings mounted adjacent the outer peripheries of said discs and rigidly secured thereto whereby said discs will form a part of said rim, said discs also being provided with apertures for receiving said lugs, and a bolt extending through said lugs and flange for clamping and securing the same together.

In witness whereof, I have hereunto affixed my signature.

GEORGE O. ROCKWOOD.